R. ROTHWELL.
Lathe Chuck.

No. 53,683. Patented April 3, 1866.

WITNESSES:

INVENTOR.

UNITED STATES PATENT OFFICE.

RICHARD ROTHWELL, OF DOVER, NEW HAMPSHIRE.

IMPROVEMENT IN LATHE-CHUCKS.

Specification forming part of Letters Patent No. 53,683, dated April 3, 1866.

*To all whom it may concern:*

Be it known that I, R. ROTHWELL, of Dover, in the county of Strafford and State of New Hampshire, have invented a new and useful Improvement in Lathe-Chucks; and I do hereby declare that the following is a full, clear, and exact description thereof, which will enable others skilled in the art to make and use the same, reference being had to the accompanying drawings, forming part of this specification.

This invention relates to a chuck for lathes when hollow shafts, cylinders, &c., are to be turned in the lathes; and it consists in forming the chuck of a conical shape, cored and turned out for a portion of its length through its center from its large end or base toward its apex, and with a series of similar gradual tapering grooves both in width and depth from its base to its apex, or nearly so, which chuck so formed is placed by its hollow center upon the spindle of the tail-stock of the lathe, and there secured in any proper manner, when, moving the rest in which the tail-spindle is hung up and toward one end of the hollow shaft or cylinder which is to be turned, (its other end having been previously fastened to and set upon the head-plate of the lathe in any proper manner,) the conical chuck enters the hollow shaft at such end, in which it is brought to as tight and close a bearing as it will permit, when, driving suitable-shaped wedges into its grooves, the said hollow shaft or cylinder, as the case may be, can be firmly bound thereon and trued in position, so that as the lathe is operated there will be no slip by the hollow shaft upon the lathe-chuck.

Figure 1:
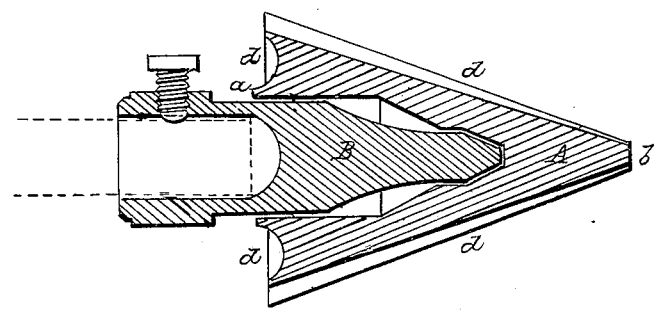
Figure 2:
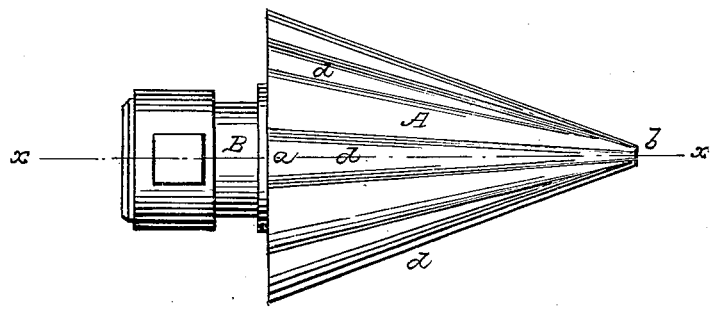
Figure 3:
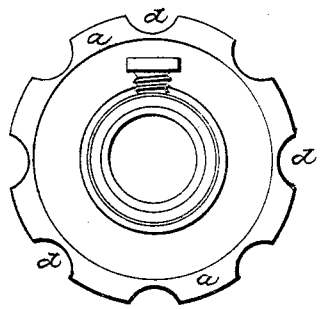

In accompanying plate of drawings my improved lathe-chuck is illustrated, Figure 1 being a side view of the same; Fig. 2, a central vertical section taken in the plane of the line $x\,x$, Fig. 1; and Fig. 3, a view of the rear or base end of the conical chuck.

Similar letters of reference indicate like parts.

A in the drawings represents my improved lathe-chuck to be used for the turning of hollow shafts, cylinders, &c., made of a conical shape, and bored out in its center for a portion of its length from its base $a$ toward the apex $b$ of a shape substantially as shown in the drawings, by which it is placed upon the tail-spindle B of the lathe.

The periphery of the clutch has a series of circular-shaped grooves, $d\,d\,d$, extending from its base toward the apex, where they all meet, these grooves tapering both in width and depth as they approach the apex, where they cease. Over this chuck one end of the shaft to be turned is placed, the other end having been previously and properly adjusted or set upon the face-plate of the lathe, when, bringing the chuck to as tight and close a bearing within the hollow shaft as is possible, it is then "trued up" (so termed) and still further tightened thereon by driving into the shaft through the grooves or depressions $d\,d$ in the chuck suitable-shaped wedges therefor, thereby causing the hollow shaft to be tightly and firmly held in position without the least danger of its slipping as the lathe is operated.

I claim as new and desire to secure by Letters Patent—

The conical-shaped lathe-chuck A, having a series of longitudinal grooves or depressions, $d\,d$, upon its periphery, substantially as and for the purpose specified.

The above specification of my invention signed by me this 6th day of November, 1865.

RICHARD ROTHWELL.

Witnesses:
SAM. M. WHEELER,
JOSHUA G. HALL.